US012681812B2

(12) United States Patent
Yamamoto et al.

(10) Patent No.: US 12,681,812 B2
(45) Date of Patent: Jul. 14, 2026

(54) GRAPHICS SYSTEM OPERATION FAILURE DETECTION

(71) Applicants: DENSO International America, Inc., Southfield, MI (US); DENSO CORPORATION, Kariya (JP)

(72) Inventors: Kazuhiro Yamamoto, Novi, MI (US); Ural Kota, Novi, MI (US); Kevin Mchugh, Brownstown, MI (US)

(73) Assignees: DENSO International America, Inc., Southfield, MI (US); DENSO CORPORATION (JP)

( * ) Notice: Subject to any disclaimer, the term of this patent is extended or adjusted under 35 U.S.C. 154(b) by 77 days.

(21) Appl. No.: 18/937,643

(22) Filed: Nov. 5, 2024

(65) Prior Publication Data

US 2025/0291683 A1     Sep. 18, 2025

Related U.S. Application Data

(60) Provisional application No. 63/565,167, filed on Mar. 14, 2024.

(51) Int. Cl.
| | |
|---|---|
| *G06F 11/26* | (2006.01) |
| *G06F 3/14* | (2006.01) |
| *G06F 11/16* | (2006.01) |
| *G06F 11/22* | (2006.01) |

(52) U.S. Cl.
CPC ........ *G06F 11/1629* (2013.01); *G06F 3/1407* (2013.01); *G06F 11/2221* (2013.01); *G06F 11/26* (2013.01)

(58) Field of Classification Search
CPC ...... G06F 11/22; G06F 11/2221; G06F 11/26; G06F 11/1629; G06F 11/3051; G06F 3/1407; G09G 2330/12
See application file for complete search history.

(56) References Cited

U.S. PATENT DOCUMENTS

| | | | | |
|---|---|---|---|---|
| 2007/0200989 | A1* | 8/2007 | Shinichi | ............ G02F 1/134309 |
| | | | | 349/139 |
| 2013/0265347 | A1* | 10/2013 | Bae | ...................... G09G 3/3655 |
| | | | | 345/691 |
| 2021/0225248 | A1* | 7/2021 | Cheng | ...................... G09G 3/20 |

FOREIGN PATENT DOCUMENTS

| | | | | | |
|---|---|---|---|---|---|
| CN | 115145778 | A | * | 10/2022 | .......... G06F 11/2221 |
| WO | WO-2023055386 | A1 | * | 4/2023 | .............. G06F 11/27 |

* cited by examiner

*Primary Examiner* — Yolanda L Wilson
(74) *Attorney, Agent, or Firm* — Dickinson Wright PLLC

(57) ABSTRACT

A display system for detecting a failure of a display includes a graphics generator configured to generate a checker pattern for an invisible area of the display that is invisible to a human user, wherein the checker pattern generated by the graphics generator alternates between a first pattern and a second pattern. Display output hardware is configured to generate and output display data for being rendered by the display based on the checker pattern generated by the graphics generator. A display output checker configured to determine whether the display data includes the checker pattern alternating between the first pattern and the second pattern, and wherein the display output checker is configured to reboot the display system in response to the checker pattern not alternating between the first pattern and the second pattern.

20 Claims, 3 Drawing Sheets

GRAPHICS SYSTEM OPERATION FAILURE DETECTION

CROSS-REFERENCE TO RELATED APPLICATION

The present disclosure claims the benefit of Provisional Patent Application No. 63/565,167 filed on Mar. 14, 2024 and entitled "GRAPHICS SYSTEM OPERATION FAIL-URE DETECTION BY UTILIZING INVISIBLE AREA FROM USER", the contents of which are incorporated by reference in its entirety.

TECHNICAL FIELD

The present disclosure relates to display systems and methods for detecting display system failures. More particularly, in embodiments, the present disclosure relates to display systems and methods in graphic display controllers using an invisible area to detect display system failures.

BACKGROUND

Automotive or vehicle cockpit products such as instrument panel cluster, heads up display (HUD), in-vehicle infotainment (IVI) are rapidly getting complex due to the needs of providing many safety or convenient features to the user. In order to support such a complex system, automotive cockpit products use a rich operation system and graphics system similar to PCs with Windows OS. Since the automotive cockpit systems supports safety or regulatory display contents, the systems need to be guaranteed to display the safety and regulatory content without any issues. However, since the systems are so complex, there are always possibilities the systems will stop working due to many reasons (e.g., design error, memory corruption, hardware failure, or the like). Therefore, it is important to quickly detect and correct display system failures so that the system provides correct information to the user.

SUMMARY

Described herein are embodiments of systems and methods for detecting and resolving failures of a display system. In an embodiment, a display system for detecting a failure of a display includes a graphics generator configured to generate a checker pattern for an invisible area of the display that is invisible to a human user. The checker pattern generated by the graphics generator alternates between a first pattern and a second pattern. Display output hardware is configured to generate and output display data for being rendered by the display based on the checker pattern generated by the graphics generator. A display output checker is configured to determine whether the display data includes the checker pattern alternating between the first pattern and the second pattern, and the display output checker is configured to reboot the display system in response to the checker pattern not alternating between the first pattern and the second pattern.

In an embodiment, a method for a detecting failure in a display system includes generating commands to draw a checker pattern in an invisible area of a display, wherein the commands cause the checker pattern to alternate between a first pattern and a second pattern; generating display data for being rendered by the display from a drawn checker pattern; determining whether display data includes the checker pattern alternating between the first pattern and second pattern;

and rebooting the display system in response to the checker pattern not alternating between the first pattern and second pattern.

In an embodiment, a display system for detecting display failures includes a vehicle display for displaying display content. A cover obscuring a portion of the vehicle display defines an invisible area of the vehicle display that is invisible to a human user and a visible area of the vehicle display that is visible to the human user. A processor, and memory including instructions that, when executed by the processor, cause the processor to: generate the display content for the invisible area and visible area of the vehicle display, wherein the display content for the invisible area includes a checker pattern that alternates between a first pattern and a second pattern; determine whether display data generated from the display content includes the checker pattern alternating between the first pattern and the second pattern; and reboot the display system in response to the checker pattern not alternating.

In an embodiment, a display system for detecting a failure of a display includes a HMI application software configured to issue commands for drawing a checker pattern in an invisible area of the display. The commands cause the checker pattern to alternate between a first pattern and a second pattern. An API is configured to execute the commands to draw the checker pattern for the display. Display output hardware is configured to generate and output display data to the display based on the checker pattern drawn by the API. A display output checker includes at least one processor programmed to check the display data and determine if the checker pattern is alternating between the first pattern and the second pattern. The at least one processor is further programmed to reboot the display system in response to the checker pattern not alternating between the first pattern and the second pattern.

In an embodiment, a method for a detecting failure in a display system includes issuing commands to draw a checker pattern in an invisible area of a display, wherein the commands cause the checker pattern to alternate between a first pattern and a second pattern; generating display data for being rendered by the display from the drawn checker pattern; checking the display data to determine if the checker pattern is alternating between the first pattern and second pattern; and rebooting the display system in response to the checker pattern is not alternating between the first pattern and second pattern.

In an embodiment, a display system for detecting display failures includes a vehicle display for displaying display content in a visible area of the vehicle display. A cover obscuring a portion of the vehicle display defines an invisible area of the vehicle display that is invisible to a human user. A HMI application software is configured to issue commands for drawing a checker pattern in the invisible area of the vehicle display and the display content for the visible area of the vehicle display, wherein the checker pattern alternates between a first pattern and a second pattern. An API is configured to execute the commands to draw the checker pattern and the display content. Display output hardware is configured to generate and output display data to the vehicle display from the checker pattern and the display content drawn by the API. A display output checker includes at least one processor programmed to check the display data and determine if the checker pattern is alternating between the first pattern and the second pattern at a set rate, and wherein the at least one processor is further programmed to reboot the display system in response to the checker pattern not alternating between the first pattern and the second pattern.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Described herein are systems and methods for detecting and resolving failures of a display system. Display system failures may unexpectedly occur as a result of software failures, hardware failures, memory corruption by external noise, or the like. Display system failures can result in situations that are unsafe or disadvantageous to a user who is relying on the display system for up-to-date information. For example, a display system failure may cause the display to freeze, blank out, or the like. The user may be unaware of the display system failure and consequently rely on incorrect or outdated information. Accordingly, the system and methods provide several benefits such as self-supervision (e.g., checking and resolving display system failures), preventing the user from receiving and relying on incorrect information, and allowing the user to more safely rely on the information displayed without having to check or reboot the display system themselves.

Figure 1:
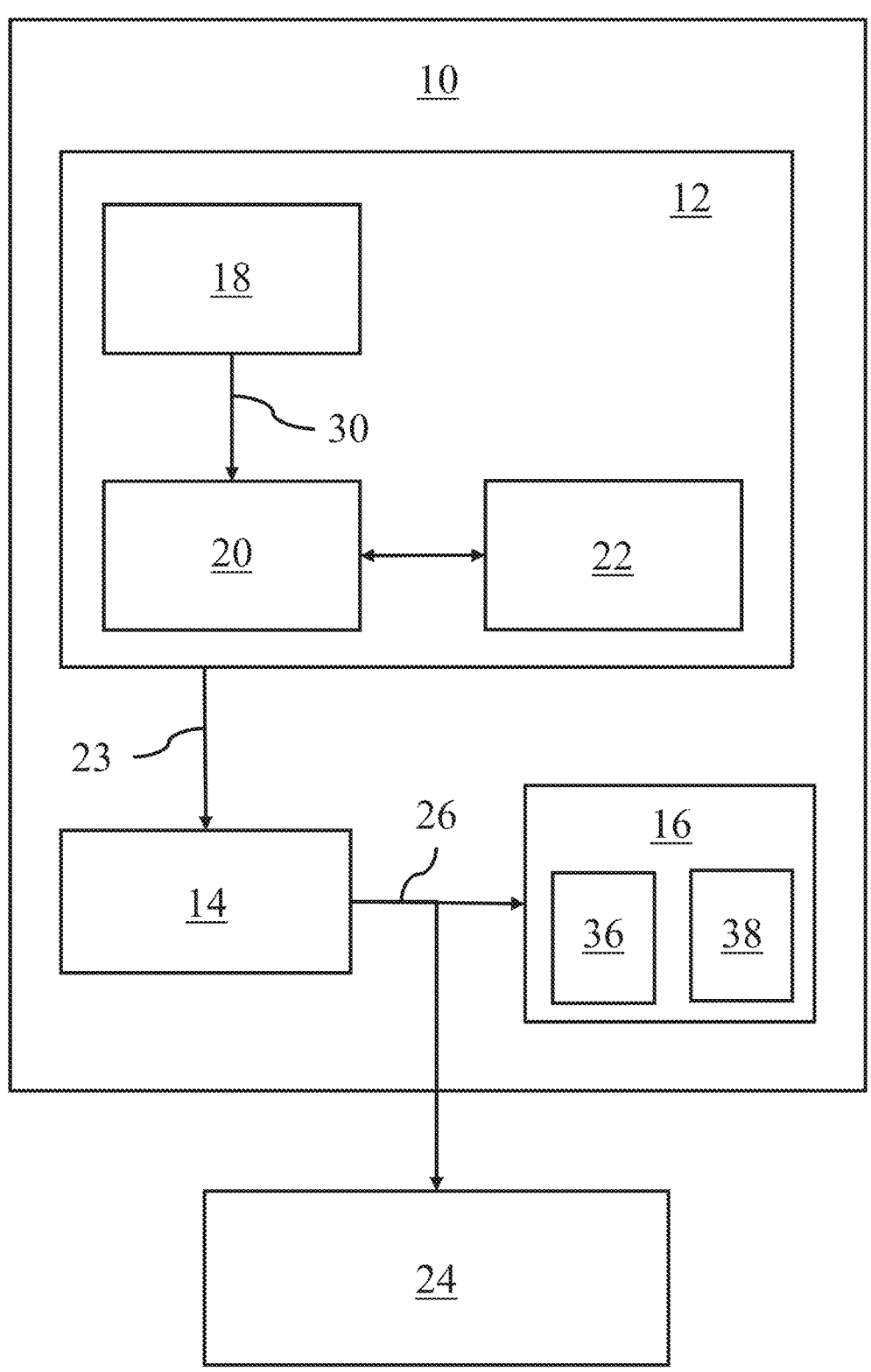
FIG. 1 is a schematic block diagram of a display system, according to an embodiment of the present disclosure.

FIG. 1 is a block diagram illustrating an exemplary embodiment of a display system 10 that may be configured to implement one or more aspects of the present disclosure. The display system 10 may be implemented in a graphic display controller for a vehicle (e.g., a car, truck, airplane, or the like) and/or other non-vehicle devices, applications, or systems (e.g., a phone, a tablet, a security or remote camera, a ballistics device, heads-up display, television, navigation system, or other system involving information displayed on a display, or the like). The display system 10 may include a combination of electronic devices and computing program(s), wherein the computing program may be a set of instructions and the electronic device may be any electronic circuit capable of implementing the corresponding step or steps of the cited methods for detecting a failure of the display system 10. The computer program may be in the form of source code, object code, a code intermediate source and object code such as in partially compiled form, or in any other form suitable for use in the implementation of methods for detecting correct or incorrect operation of the display during display of the video signal.

Figure 2:
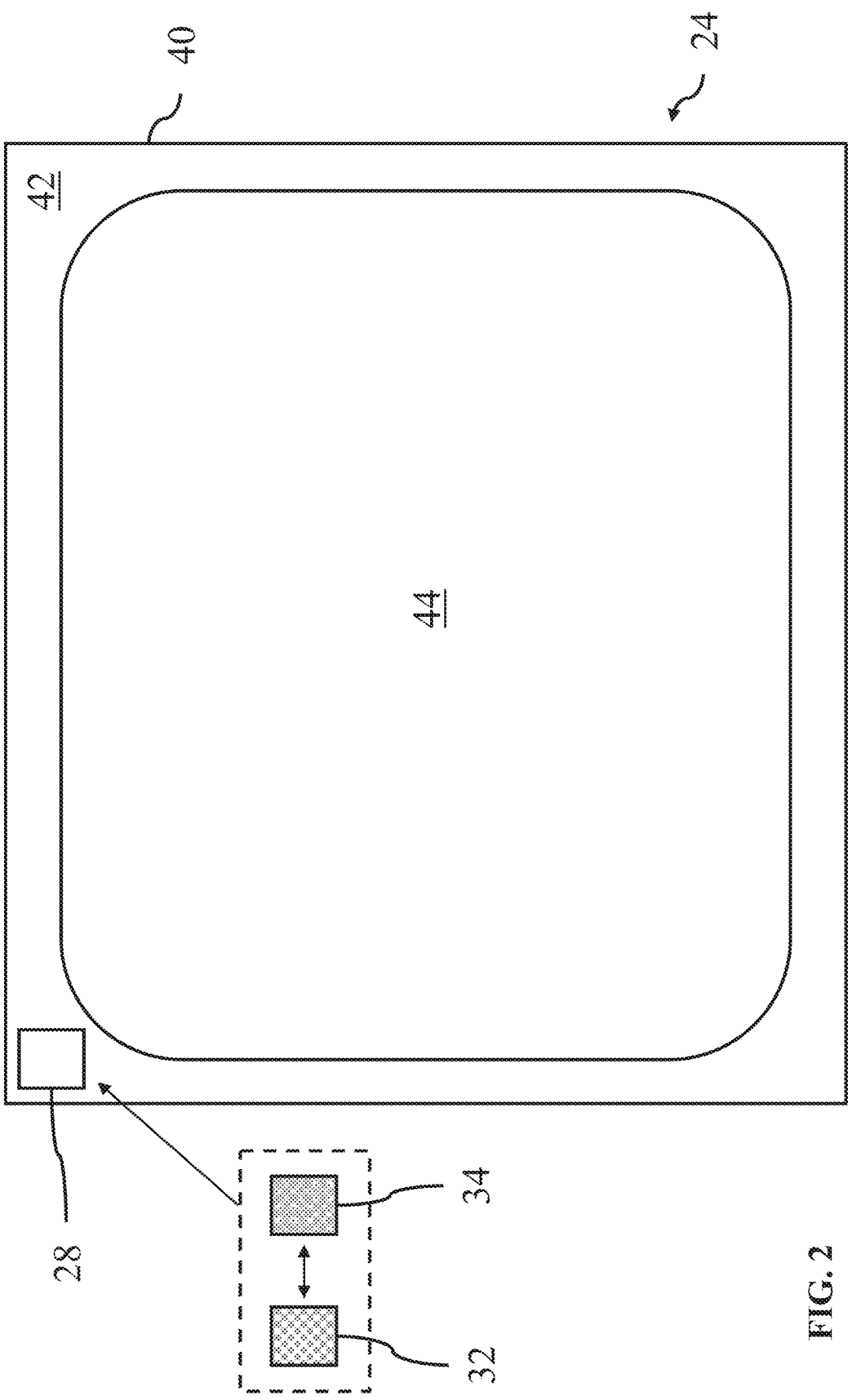
FIG. 2 illustrates a display including a cover that defines an invisible and visible area of the display.

Referring to FIGS. 1 and 2, in an embodiment the display system 10 includes a graphics generator (and/or graphics generator software) 12, a display output unit (DOU) 14, and a display output checker (DOC) 16. It should be understood that display system 10 may include modules and units other than the ones in the example of FIG. 1, and that, in some examples, display system 10 may also not include one or more of the modules and units in the example of FIG. 1.

In certain embodiments, the graphics generator 12 may include a human machine interface (HMI) application software 18, an application programing interface (API) 20, and/or a graphics processing unit (GPU) 22. The graphics generator 12, the HMI application software 18, the API 20, the GPU 22, the DOU 14, and the DOC 16 may include processor hardware (shared, dedicated, or group) that executes code and memory hardware (shared, dedicated, or group) that stores code executed by the processor hardware. The code is configured to provide the features of the methods and systems described herein. The processor hardware may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The graphics generator 12, HMI application software 18, the API 20, the GPU 22, the DOU 14, and the DOC 16 may be stored on the same or a different type of memory or non-volatile storage. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information.

The processor hardware may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the graphics generator 12, HMI application software 18, the API 20, the GPU 22, the DOU 14, or the DOC 16 to output display data 23 to an invisible area 42 of a display 24, check the display data 23 to determine if there is failure of or within the displays system 10, and reboot the display system 10 in a recovering mode if a failure is detected, for example.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC").

In an embodiment, the graphics generator 12 is configured to generate display content 26 for being received by the DOC 16, wherein the DOC 16 is configured to generate and output display data 23 for being rendered by the display 24. The graphics generator 12 is configured to generate display content 26 for an invisible area an invisible area 42 of the display 24 that is invisible to a human user and a visible area 44 of the display 24 that is visible to the human user. For example, the display content 26 can include a checker pattern 28 such that the graphics generator 12 is configured to generate the checker pattern 28 for being rendered in the invisible area 42. The display content 26 generated by the graphics generator 12 for being rendered in the visible area 44 may be based on or in response to the vehicle or the human user.

As stated above, the graphics generator 12 may include the HMI application software 18. The HMI application software 18 is configured to issue or generate commands or instructions 30 to illuminate or display content on a display 24 based on input from a vehicle or a user. For example, a vehicle may include sensors for detecting system health, fuel levels, vehicle speed, engine or cabin temperature, the presence of other vehicle or pedestrians, or the like, and the information from those sensors may be communicated to the HMI application software 18 for being displayed on the display 24. In some embodiments, the HMI application software is communicatively coupled to a reverse camera such that a rear view of the vehicle is displayed on the display 24 when the vehicle is in Reverse. A user may also provide input via one or more devices (e.g., a button, dashboard, touchscreen, or other device that is coupled to the display system 10 via a user interface, or the like) and the HMI application software 18 may provide instructions to draw corresponding information or display content on the display 24. Accordingly, the display content may include a variety of symbols or information related to the vehicle, the environment, the user, or the like.

The HMI application software 18 is also configured to issue commands or instructions 30 to draw a checker pattern 28 on the display 24. The checker pattern 28 may include a first pattern 32 and a second pattern 34. The first pattern 32 and the second pattern 34 may include colors (including white and black), shapes, symbols, or the like. For example, the first pattern 32 may be red and the second pattern 34 may be green. In some embodiments, the checker pattern 28 may include regions that alternate from the first pattern 32 to the second pattern 34, and back to the first pattern 32, and so on.

In an embodiment, the checker pattern 28 alternates between the first pattern 32 and the second pattern 34 at a set rate (i.e., rate of change from the first pattern 32 to the second pattern 34, and vice versa). The rate may be selected from the a range of based on an input by the user or vehicle, a unit of time such as one to two minutes, one to thirty seconds, ten to one thousand milliseconds, or the like, or a combination or sub-combination thereof. For example, the checker pattern 28 may alternate or toggle between the first pattern 32 and the second pattern 34 every second. In other words, the HMI application software 18 is configured to continuously issue commands to draw the checker pattern 28, wherein the checker pattern 28 alternates between the first pattern 32 and the second pattern 34 at the set rate.

The commands issued by the HMI application software 18 are received and processed by the API 20. The API 20 is configured to execute the commands from the HMI application software 18 and to draw the display contents and the checker pattern 28 for the display 24. The API 20 is configured to interact with the GPU 22 (e.g., hardware acceleration, or the like). In some embodiments, a plurality of APIs 20 are used to individually or collectively to execute the commands from the HMI application software 18 and to draw the display contents and the checker pattern 28 for the display 24. In some embodiments, the API 20 is OpenGL or the like.

The DOU 14 is configured to generate and output display signals or display data 23 to the display 24 for rendering (e.g., causing pixels of the display 24 to illuminate and display an image(s)) from the display content and the checker pattern 28 drawn by the API 20. In other words, the DOU 14 is configured to receive the drawn display content and the checker pattern 28 from the API 20 and is programmed to generate or convert the display content and the checker pattern 28 from the API to display data 23 for being displayed on the display 24. The display data 23 may output the checker pattern 28 as color data according to a color format, such as RGB data (CMY, CMYK, HSL, HSV data, or another color model, or the like, or a combination or sub-combination thereof). The display data 23 may conform to common standards such as video graphics array (VGA), high-definition multimedia interface (HDMI), or the like.

The DOC 16 is configured for receiving the display data 23 from the DOU 14 and checking or analyzing the display data 23 to determine if the checker pattern 28 is alternating between the first pattern 32 and the second pattern 34 at the set rate and if the first pattern 32 and the second pattern 34 are correct. The DOC 16 is configured for checking the display data 23 prior to the display data being displayed or rendered on the display 24 (e.g., the DOC 16 is not checking pixels on rendered on the display 24). The DOC 16 is configured to reboot the display system 10 and recover from failure mode if the checker pattern 28 is not alternating between the first pattern 32 and the second pattern 34 at the set rate and/or if the first pattern 32 and the second pattern 34 are incorrect. In some embodiments, the DOC 16 includes or is configured to relay instructions at least one processor programmed to check the display data 23 and determine if the checker pattern 28 is alternating between the first pattern 32 and the second pattern 34, and wherein the at least one processor is further programmed to reboot the display system 10 in response to the checker pattern 28 not alternating between the first pattern 32 and the second pattern 34.

In an embodiment, the DOC 16 has a first channel 36 and a second channel 38, wherein the first channel 36 is configured to monitor the first pattern 32 and the second channel 38 is configured to monitor the second pattern 34. The first channel 36 and the second channel 38 may concurrently or contemporaneously analyze the checker pattern 28 within the display data 23. When the checker pattern 28 is the first pattern 32 the first channel 36 reads true, successful, or 1 and when the checker pattern 28 is the second pattern 34 the first channel 36 reads false, unsuccessful, or 0. Vice versa, when the checker pattern 28 is the second pattern 34 the second channel 38 reads true, successful, or 1, and when the checker pattern 28 is the first pattern 32 the second channel 38 reads false, unsuccessful, or 0. When the display system 10 is operating correctly, one of the first channel 36 or the second channel 38 reads true and the other reads false at the set rate. For example, the first channel 36 reads true and the second channel 38 reads false and then a second later the first channel 36 reads false and the second channel 38 reads true.

If the first channel 36 and the second channel 38 read the same value (true or false) or are not reading the values at the set rate, then the DOC 16 will initiate a reboot of the display system 10. In other words, the DOC 16 will initiate a reboot of the display system 10 the first channel 36 and the second channel 38 are not alternating between true and false at the expected set rate, or according to an expected pattern.

In some embodiments, the first channel 36 and the second channel 38 are configured to determine if the checker pattern 28 being outputted by the DOC 16 includes the first pattern 32 or the second pattern 34 by determining if the checker pattern 28 is within a set threshold. The threshold may be set according to the color format for the first pattern 32 and the second pattern 34, wherein the threshold is a limit or range of an integer or percentage from the expected color data of the first pattern 32 and the second pattern 34. In other words, the threshold may be selected from a range of integers of 1-255 (e.g., 10, 25, 50, 75, or 100) and the percentage may be selected from range of 1-50%, or the like, or a combination or sub-combination thereof. For example, the first pattern 32 may be green with RGB data of R: 0, G: 128, B: 0 (R: 0%, G: 50%, B: 0%), and the threshold may be 20%. If the first channel 36 detects that the checker pattern 28 of the display data 23 includes RGB data of R: 0, G: 148, B: 0, then the first channel 36 will read as true. The threshold may be include one or more of the color values of the RGB data.

In some embodiments, the at least one processor of the DOC 16 includes the first channel 36 and the second channel 38. In some embodiments, the checker pattern 28 includes at least one additional colors and the DOC 16 includes at least one additional channel for monitoring the third color. The first pattern 32, the second pattern 34, and the at least one additional channel may alternate sequentially or in any other suitable pattern.

In embodiments, the checker pattern 28 of the display data 23 may include the first pattern 32 and the second pattern 34 to be rendered as a one or more pixels on the display 24. In embodiments, the checker pattern 28 may be a grid of various shapes or configurations. For example, the checker pattern 28 may be one row and two columns, wherein one column is for displaying the first pattern 32 and the other column is for displaying the second pattern 34. The grid may be two rows and two columns, such that four different regions for color display are provided. The four different regions may be individual pixels of the display 24. For example, the first pattern 32 and the second pattern 34 may be rendered as a plurality of pixels (e.g., 4×4) on the display 24 such that the display system 10 can be checked during implementation, initiation, rebooting, or the like. The four different regions may also be used to generate a particular pattern for confirming that the display system 10 is performing properly or for certain situations where a more complicated pattern may be desired for increased safety precautions.

In some embodiments, the DOC 16 includes a plurality of channels (including the first channel 36 and the second channel 38) and the plurality of channels may be assigned to check if the rows, columns, and/or individual regions of the checker pattern 28 include one of the first pattern 32 or the second pattern 34. For example, the DOC 16 may include four channels that are assigned to check the one of the four different regions to determine if the one of the four different regions includes the first pattern 32 or the second pattern 34. In some embodiments, the DOC 16 is a software component or hardware peripheral.

In some embodiments, the DOC 16 only includes a single channel (either the first channel 36 or the second channel 38) that is configured to monitor the display data 23 for both the first pattern 32 and the second pattern 34 of the checker pattern 28.

According to the present disclosure, the display system 10 may be implemented within or as part of the vehicle and is configured to check for and resolve failures of the display system 10. In other words, the display system 10 is configured to be self-supervising and prevent the user from potentially receiving incorrect information (e.g., the DOC 16 may have a hardware failure and be incorrectly outputting display data 23 such that the display 24 may be communicating incorrect information to the user). By having the display system 10 be self-supervising, unsafe or disadvantageous situations may be avoided, the user can more safely rely on the display 24, the user also does not need to be checking or rebooting the display system 10 or display 24 themselves, or the like.

Referring to FIG. 2, in an embodiment the display 24 includes a cover 40 for covering or obscuring a portion of the display 24, wherein an invisible area 42 is defined by an area of the display 24 that is obscured to the user by the cover 40 (i.e., the invisible area 42 cannot be seen by a human user). The invisible area 42 may therefore be also referred to as a hidden area or obscured area. A visible area 44 is defined by an area of the display 24 that is not obscured to the user by the cover 40. In other words, the user can see the visible area 44 but cannot see the invisible area 42 (due to the cover 40). The checker pattern 28 is displayed in the invisible area 42 such that the checker pattern 28 cannot be seen by the user. In this way, the user is not distracted by the checker pattern 28 alternating between first pattern 32 and the second pattern 34. The location of the checker pattern 28 in the invisible area 42 may be selected based on the size and shape of the display 24, the cover 40, the invisible area 42, or the like. In the illustrated embodiment, the checker pattern 28 is located in a corner of the display 24, but other locations may be selected. In some embodiments, the checker pattern 28 may be consistently displayed in the same location within the invisible area 42, or may be cycled between different locations within the invisible area 42.

The cover 40 may be composed of plastic, metal, wood, ceramic, or the like, or a combination or sub-combination thereof, and may include any desired color (e.g., black). In some embodiments, the cover 40 is disposed around a perimeter of the display 24 such that the cover 40 obscures the peripheral edges of the display 24 around all or some of the perimeter of the display 24. The cover 40 may extend outwardly relative to the display 24. In some embodiments, the visible area 44 is greater than the invisible area 42.

In some embodiments, the display 24 may be a screen such as a thin-film-transistor (TFT) liquid-crystal display, a light emitting diode (LED) display, an organic light emitting diode (OLED) display, a cathode ray tube (CRT) display, a plasma display, another type of display device, or the like. The display 24 may be a vehicle display in that the display 24 is installed on or located within the vehicle (e.g., a dashboard or HUD of the vehicle), or part of separate device that is communicatively coupled to the vehicle (e.g., a phone, tablet, computer monitor, etc.).

Figure 3:
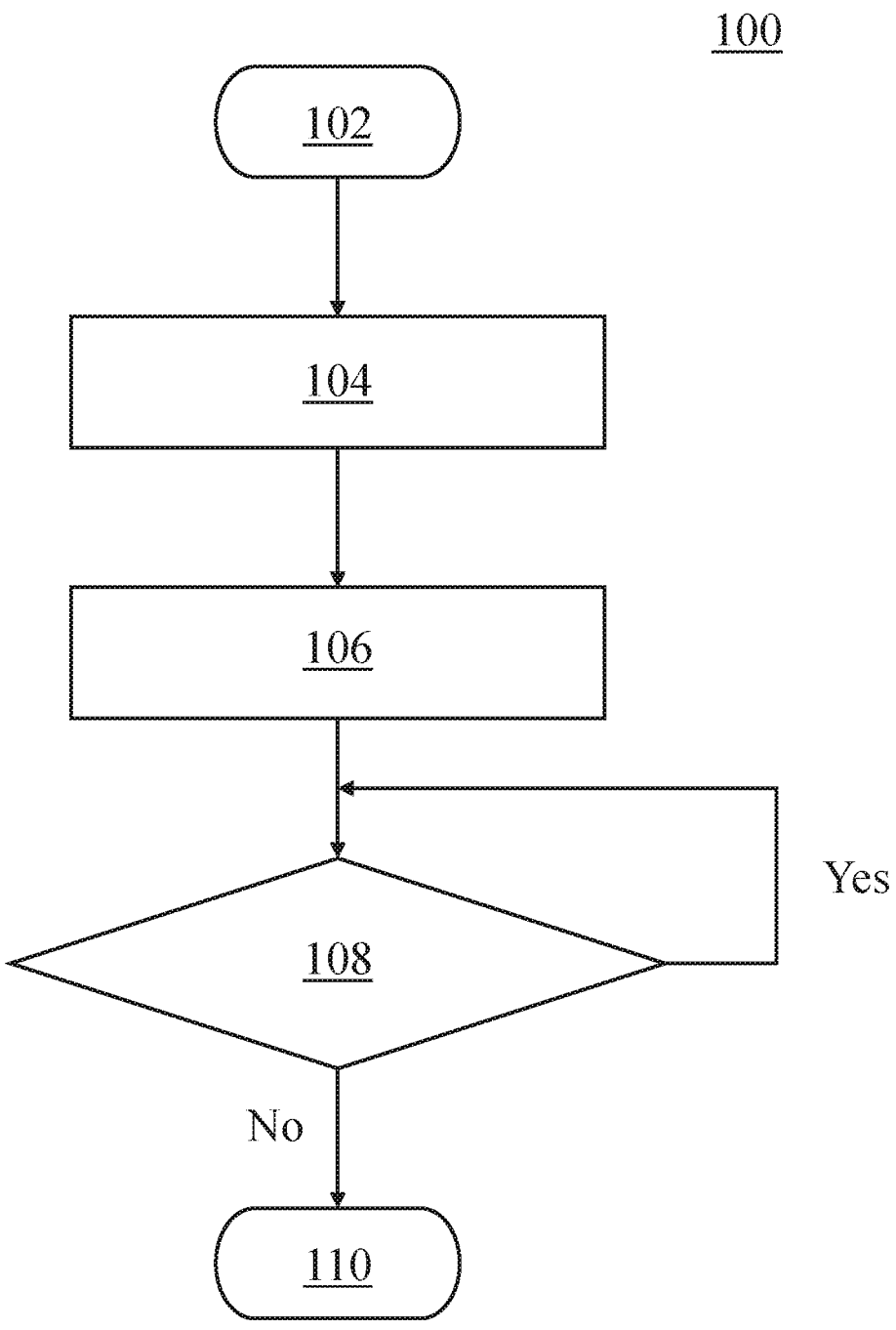
FIG. 3 is a process flow diagram of a method for detecting failures of the display system, according to an embodiment of the present disclosure.

FIG. 3 illustrates a method 100 of monitoring the display system 10 according to an embodiment. The method 100 can be performed by the display system 10. At 102, the display system 10 is booted up or started. At 104, the checker pattern 28 is drawn for the invisible area 42 of the display 24. At 106, the DOC 16 begins monitoring the checker pattern 28. At 108, the checker pattern 28 the DOC 16 determines if the checker pattern 28 is alternating between the first pattern 32 and the second pattern 34 at the set rate. If the checker pattern 28 is alternating between the first pattern 32 and the second pattern 34 at the set rate, then the method 100 continues to monitor the checker pattern 28. If the checker pattern 28 is not alternating between the first pattern 32 and the second pattern 34 at the set rate (i.e., a failure is detected), then at 110 the display system 10 is rebooted to recover from failure mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A display system for detecting a failure of a display, the system comprising:
   a graphics generator configured to generate a checker pattern for an invisible area of the display that is invisible to a human user, wherein the checker pattern generated by the graphics generator alternates between a first pattern and a second pattern;
   display output hardware configured to generate and output display data for being rendered by the display based on the checker pattern generated by the graphics generator; and
   a display output checker configured to determine whether the display data includes the checker pattern alternating between the first pattern and the second pattern, and wherein the display output checker is configured to reboot the display system in response to the checker pattern not alternating between the first pattern and the second pattern.

2. The display system of claim 1 wherein the graphics generator is configured to generate display content for a visible area of the display, wherein the visible area is visible to the user; and
   wherein the display output hardware is configured to generate and output display data to the display based on the checker pattern and display content generated by the graphics generator.

3. The display system of claim 1 wherein the checker pattern alternates between the first pattern and the second pattern at a set rate; and
   wherein the display output checker is configured to check the display data for determining if the checker pattern is alternating between the first pattern and the second pattern at the set rate, and reboot the display system if the checker pattern is not alternating between the first pattern and the second pattern at the set rate.

4. The display system of claim 3 wherein the set rate is unit of time, such that the checker pattern alternates between the first pattern and the second pattern per the unit of time.

5. The display system of claim 1 wherein the display output checker includes a first channel configured to check the checker pattern for the first pattern and a second channel configured to check the checker pattern for the second pattern;
   wherein the first channel reads true when the checker pattern includes the first pattern and reads false when the checker pattern includes the second pattern;

wherein the second channel reads true when the checker pattern includes the second pattern and reads false when the checker pattern includes the first pattern; and wherein the display output checker determines that the display system is operating correctly when the first channel and the second channel alternate between reading true and false.

6. The display system of claim 5 wherein the first channel is configured to determine if the checker pattern includes the first pattern with a threshold limit, wherein the first channel reads true when the checker pattern includes the first pattern within the threshold limit and reads false when the checker pattern includes the second pattern or a color outside of the threshold limit; and wherein the second channel is configured to determine if the checker pattern includes the second pattern within the threshold limit, wherein the second channel reads true when the checker pattern includes the second pattern and reads false when the checker pattern includes the first pattern or a color outside of the threshold limit.

7. The display system of claim 6 wherein the first pattern and the second pattern include color data and the threshold limit includes a range from the color format of the first pattern and the second pattern.

8. The display system of claim 1 wherein the display system includes the display and a cover for obscuring a portion of the display to define the invisible area.

9. A method for a detecting failure in a display system, the method comprising:

generating commands to draw a checker pattern in an invisible area of a display, wherein the commands cause the checker pattern to alternate between a first pattern and a second pattern;

generating display data for being rendered by the display from a drawn checker pattern;

determining whether display data includes the checker pattern alternating between the first pattern and second pattern; and rebooting the display system in response to the checker pattern not alternating between the first pattern and second pattern.

10. The method of claim 9 further comprising generating commands to draw display content for a visible area of the display;

drawing the display content and the checker pattern; and wherein generating display data for the display includes the drawn display content.

11. The method of claim 10 wherein the commands to draw the checker pattern and display content are issued by an human machine interface (HMI) application software;

wherein the display content and the checker pattern are drawn by an application program interface (API);

wherein the display data is generated by display output hardware; and wherein a display output checker determines whether the checker pattern is alternating between the first pattern and second pattern and wherein the display system is rebooted by the display output checker.

12. The method of claim 9 wherein the determining whether the checker pattern is alternating between the first pattern and second pattern includes determining whether the checker pattern is alternating between the first pattern and second pattern at a set rate; and wherein rebooting the display system includes the checker pattern not alternating between the first pattern and the second pattern at the set rate.

13. The method of claim 9 wherein the checking the display data includes a display output checker having a first channel configured to check the checker pattern for the first pattern and a second channel configured to check the checker pattern for the second pattern;

wherein the first channel reads true when the checker pattern includes the first pattern and reads false when the checker pattern includes the second pattern;

wherein the second channel reads true when the checker pattern includes the second pattern and reads false when the checker pattern includes the first pattern; and wherein the display output checker determines that the display system is operating correctly when the first channel and the second channel alternate between reading true and false.

14. The method of claim 9 wherein the checking the display data includes determining if the checker pattern includes the first pattern or the second pattern within a threshold limit; and wherein the threshold limit includes a range based on a color format of the first pattern and the second pattern.

15. The display system of claim 14 wherein the first pattern and the second pattern include color data and the threshold limit includes a range from the color format of the first pattern and the second pattern.

16. A display system for detecting display failures, the display system comprising:

a vehicle display for displaying display content;

a cover obscuring a portion of the vehicle display to define an invisible area of the vehicle display that is invisible to a human user and a visible area of the vehicle display that is visible to the human user;

a processor;

memory including instructions that, when executed by the processor, cause the processor to:

generate the display content for the invisible area and visible area of the vehicle display, wherein the display content for the invisible area includes a checker pattern that alternates between a first pattern and a second pattern;

determine whether display data generated from the display content includes the checker pattern alternating between the first pattern and the second pattern; and reboot the display system in response to the checker pattern not alternating.

17. The display system of claim 16 further comprising a display output checker configured to determine whether the display data generated from the display content includes the checker pattern alternating between the first pattern and the second pattern and to reboot the display system in response to the checker pattern not alternating between the first pattern and the second pattern.

18. The display system of claim 16 wherein the display output checker includes a first channel configured to check the checker pattern for the first pattern and a second channel configured to check the checker pattern for the second pattern;

wherein the first channel reads true when the checker pattern includes the first pattern and reads false when the checker pattern includes the second pattern;

wherein the second channel reads true when the checker pattern includes the second pattern and reads false when the checker pattern includes the first pattern; and wherein the display output checker determines that the display system is operating correctly when the first channel and the second channel alternate between reading true and false.

19. The display system of claim 16 wherein the display output checker is a software component or hardware peripheral.

20. The display system of claim 16 further comprising:

an human machine interface (HMI) application software configured to generate commands for drawing the display content;

an application program interface (API) configured to execute the commands to generate the display content; and display output hardware configured to generate and output the display data to the vehicle display from the display content generated by the API.

* * * * *